(12) United States Patent
Kosuda et al.

(10) Patent No.: US 7,310,219 B2
(45) Date of Patent: Dec. 18, 2007

(54) ELECTROCHEMICAL CAPACITOR

(75) Inventors: Atsuko Kosuda, Chuo-ku (JP); Satoshi Maruyama, Chuo-ku (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/541,070

(22) PCT Filed: May 7, 2004

(86) PCT No.: PCT/JP2004/006491

§ 371 (c)(1),
(2), (4) Date: Jun. 29, 2005

(87) PCT Pub. No.: WO2004/100195

PCT Pub. Date: Nov. 18, 2004

(65) Prior Publication Data

US 2006/0087799 A1  Apr. 27, 2006

(30) Foreign Application Priority Data

May 9, 2003  (JP) ............................. 2003-132188

(51) Int. Cl.
*H01G 9/00* (2006.01)
(52) U.S. Cl. ...................................... 361/502; 361/503
(58) Field of Classification Search ........ 361/502–504, 361/508–510, 516–520, 528–529, 532–535
See application file for complete search history.

(56) References Cited

U.S. PATENT DOCUMENTS

| 4,862,328 | A | * | 8/1989 | Morimoto et al. ......... 361/502 |
| 5,748,437 | A | * | 5/1998 | Andelman ................. 361/302 |
| 5,953,204 | A | * | 9/1999 | Suhara et al. ............. 361/502 |
| 6,258,337 | B1 | * | 7/2001 | Sonobe et al. .......... 423/445 R |
| 6,413,409 | B1 | * | 7/2002 | Otowa et al. ............. 205/748 |
| 6,620,366 | B2 | * | 9/2003 | Sagal .................... 264/272.11 |
| 6,808,845 | B1 | * | 10/2004 | Nonaka et al. ............ 429/213 |
| 2003/0215709 | A1 | | 11/2003 | Hosokawa et al. | |

FOREIGN PATENT DOCUMENTS

| JP | 60-211821 | 10/1985 |
| JP | A 60-211821 | 10/1985 |
| JP | 63-218159 | 3/1987 |
| JP | A 63-218159 | 9/1988 |
| JP | 4-088619 | 3/1992 |
| JP | 08-107047 | 4/1996 |

(Continued)

OTHER PUBLICATIONS

Japanese Notification and Translation of Notification, May 23, 2006.

*Primary Examiner*—Eric Thomas
(74) *Attorney, Agent, or Firm*—Oliff & Berridge, PLC

(57) ABSTRACT

The present invention relates to an electrochemical capacitor, and provides an electrochemical capacitor which has a fully lowered internal resistance and can yield excellent charging/discharging characteristics. The electrochemical capacitor of the present invention is mainly constituted by an anode and a cathode which oppose each other, an insulating separator disposed between the anode and cathode adjacent thereto, an electrolytic solution, and a casing accommodating them in a closed state. The anode contains a substantially spherical carbon material having an electronic conductivity as a constituent material, whereas the cathode contains a fibrous carbon material having an electronic conductivity as a constituent material.

8 Claims, 6 Drawing Sheets

FOREIGN PATENT DOCUMENTS

| | | |
|---|---|---|
| JP | 2001-146410 | 11/1999 |
| JP | 2000-353642 | 12/2000 |
| JP | A 20001-146410 | 5/2001 |
| JP | 2003-045378 | 8/2001 |
| JP | 2002-134369 | 5/2002 |
| JP | A 2003-045378 | 2/2003 |

\* cited by examiner

Fig. 10

| | CATHODE ACTIVE CARBON FORM | ANODE ACTIVE CARBON FORM | INTERNAL RESISTANCE (IMPEDANCE) /Ω at 1kHz | | | RATE CHARACTERISTIC EVALUATION TEST RESULT (C2/C1) /% |
|---|---|---|---|---|---|---|
| | | | INITIAL | AFTER VERIFYING CAPACITY | AFTER RATE CHARACTERISTIC EVALUATION TEST | |
| EXAMPLE 1 | FIBROUS | SUBSTANTIALLY SPHERICAL | 0.64 | 1.13 | 1.62 | 80.0 |
| COMPARATIVE EXAMPLE 1 | SUBSTANTIALLY SPHERICAL | FIBROUS | 0.64 | 2.92 | 4.45 | 49.9 |
| COMPARATIVE EXAMPLE 2 | SUBSTANTIALLY SPHERICAL | SUBSTANTIALLY SPHERICAL | 0.56 | 4.81 | 8.74 | 38.7 |
| COMPARATIVE EXAMPLE 3 | FIBROUS | FIBROUS | 0.75 | 1.08 | 1.61 | 67.4 |

ELECTROCHEMICAL CAPACITOR

TECHNICAL FIELD

The present invention relates to an electrochemical capacitor.

BACKGROUND ART

Electrochemical capacitors such as electric double layer capacitors utilize a capacity due to an electric double layer generated at an electrode electrolytic solution interface of a polarizable electrode. In general, the polarizable electrode is formed by using a porous carbon material as a constituent material.

Electrochemical capacitors such as electric double layer capacitors can easily reduce their size and weight, and thus are expected to become backup power supplies for power supplies of portable devices (small-size electronic devices) and the like and auxiliary power supplies for hybrid cars, for example, whereby various studies have been under way for improving their performances.

Proposed as examples of the above-mentioned studies include an electric double layer capacitor aimed at improving its performances by adjusting specific surface areas of carbon materials used in its anode and cathode to respective predetermined ranges (see, for example, the following Japanese Patent Application Laid-Open No. HEI 8-107047) and an electric double layer capacitor comprising an electrode formed by using a plurality of species of activated carbon having respective characteristics different from each other (e.g., a mixture of activated carbon with a lower internal resistance and activated carbon having a large capacitance or energy density) so as to improve its performances (see, for example, the following Japanese Patent Application Laid-Open No. 2000-353642).

DISCLOSURE OF THE INVENTION

The inventors have found that conventional electrochemical capacitors such as the electric double layer capacitors disclosed in the above-mentioned two publications have not fully lowered the internal resistance (impedance) and have not attained sufficient charging/discharging characteristics yet.

It is an object of the present invention to provide an electrochemical capacitor which has a fully lowered internal resistance and can attain excellent charging/discharging characteristics.

The inventors conducted diligent studies in order to achieve the above-mentioned object and, as a result, have found that a configuration of unit cell comprising a combination of an anode formed by using a carbon material satisfying a specific geometric condition which will be mentioned in the following and a cathode formed by using a carbon material satisfying a specific geometric condition which will be mentioned in the following is quite effective in achieving the above-mentioned object, thereby attaining the present invention.

Namely, the present invention provides an electrochemical capacitor comprising an anode and a cathode opposing each other; an insulating separator disposed between the anode and cathode; an electrolytic solution; and a casing accommodating the anode, cathode, separator, and electrolytic solution in a closed state; wherein the anode contains a substantially spherical carbon material having an electronic conductivity as a constituent material; and wherein the cathode contains a fibrous carbon material having an electronic conductivity as a constituent material.

The electrochemical capacitor in accordance with the present invention comprises an electrode formed by using a substantially spherical carbon material as an anode and an electrode formed by using a fibrous carbon material as a cathode, and thus can fully reduce the internal resistance and exhibit excellent charging/discharging characteristics.

In the present invention, the "anode" and "cathode" are determined according to their polarities at the time of discharging the electrochemical capacitor. Namely, the electrode releasing electrons when discharging the electrochemical capacitor is the "anode", whereas the electrode receiving electrons at the time of discharging is the "cathode".

In the present invention, the "fibrous carbon material" refers to one whose particle has an aspect ratio of at least 2. When the aspect ratio of the fibrous carbon material is less than 2, its difference from the aspect ratio of the "substantially spherical carbon material", which will be explained later, becomes insufficient, and the impedance of the capacitor increases, whereby no sufficient rate characteristic can be obtained. From the viewpoint of more reliably obtaining the effects of the present invention mentioned above, the aspect ratio of the particle made of the "fibrous carbon material" is preferably 2 to 8, more preferably 4 to 6. When the aspect ratio of the fibrous carbon material exceeds 8, the making of a coating (a liquid having a coatable viscosity) is more likely to become difficult when preparing a coating liquid for forming an electrode containing a fibrous carbon material or a kneaded product for forming an electrode.

In the present invention, the "substantially spherical carbon material" refers to one whose particle has an aspect ratio of 1.5 or less. When the aspect ratio of the particle made of the substantially spherical carbon material exceeds 1.5, the difference from the aspect ratio of the above-mentioned "fibrous carbon material" becomes insufficient, and the current density decreases, whereby the loss in energy density increases. From the viewpoint of more reliably attaining the above-mentioned effects of the present invention, the aspect ratio of the particle made of the "substantially spherical carbon material" is preferably 1 to 1.5, more preferably 1 to 1.3.

BRIEF DESCRIPTION OF THE DRAWINGS

FIG. 10 is a chart showing a table listing internal resistances and rate characteristics of electrochemical capacitors in accordance with Example 1 and Comparative Examples 1 to 3.

BEST MODES FOR CARRYING OUT THE INVENTION

In the following, a preferred embodiment of the electrochemical capacitor in accordance with the present invention will be explained in detail with reference to the drawings. This embodiment explains a casing where the electrochemical capacitor in accordance with the present invention is employed in an electric double layer capacitor. In the following explanation, parts identical or equivalent to each other will be referred to with numerals identical to each other without repeating their overlapping descriptions.

Figure 1:
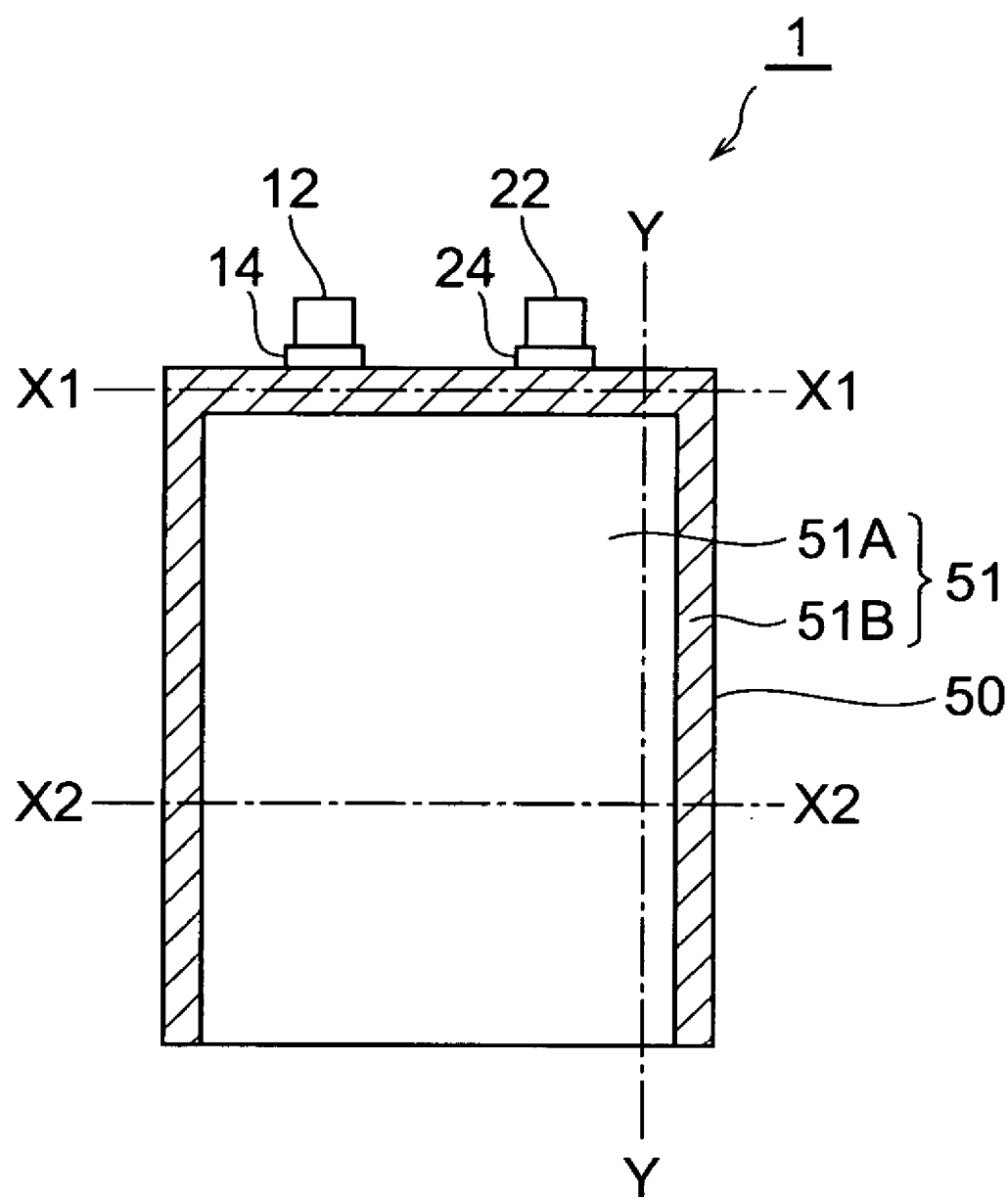
FIG. 1 is a front view showing a preferred embodiment of the electrochemical capacitor in accordance with the present invention.
Figure 2:
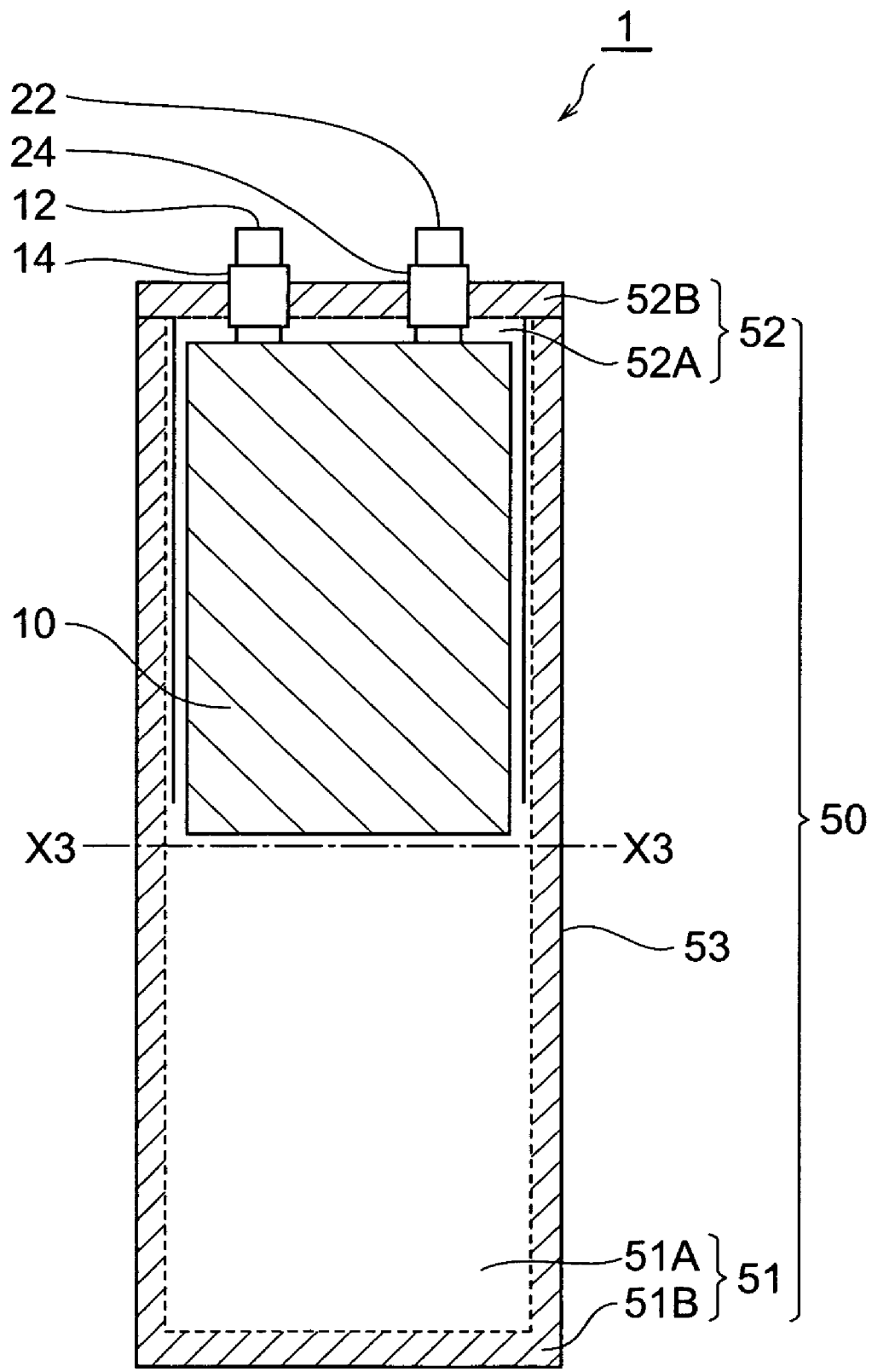
FIG. 2 is an unfolded view of the inside of the electrochemical capacitor shown in FIG. 1 as seen in a normal direction of a surface of an anode 10.
Figure 3:
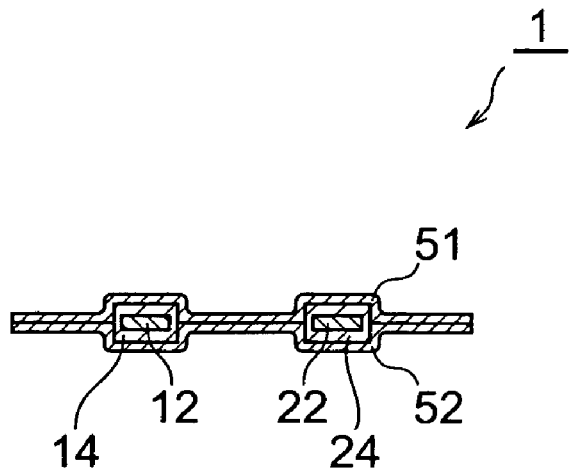
FIG. 3 is a schematic sectional view of the electrochemical capacitor shown in FIG. 1 taken along the line X1-X1 of FIG. 1.
Figure 4:
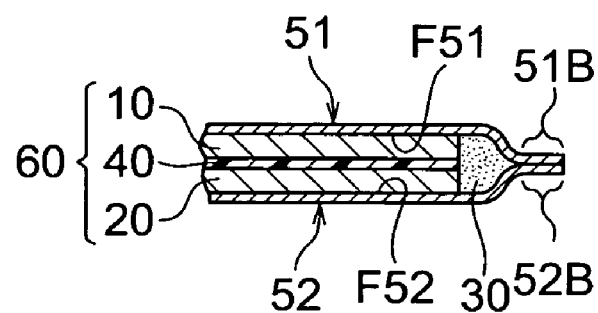
FIG. 4 is a schematic sectional view showing a major part of the electrochemical capacitor shown in FIG. 1 taken along the line X2-X2 of FIG. 1.
Figure 5:
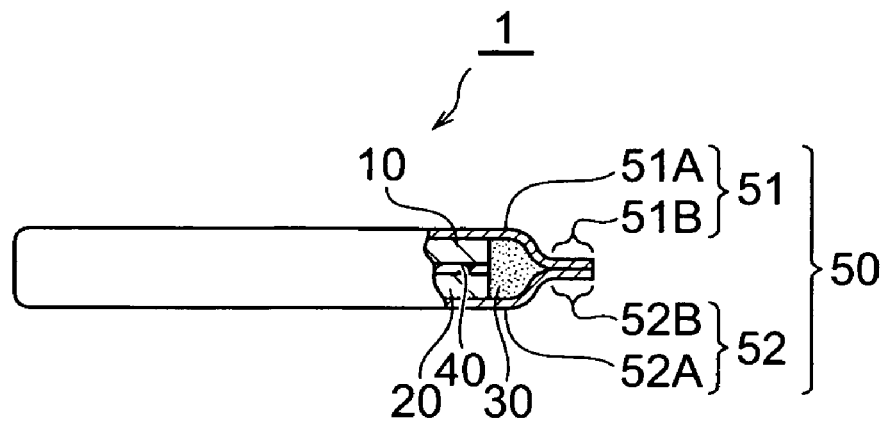
FIG. 5 is a partly broken side view of the electrochemical capacitor shown in FIG. 1.

FIG. 1 is a front view showing a preferred embodiment of the electrochemical capacitor in accordance with the present invention. FIG. 2 is an unfolded view of the inside of the electrochemical capacitor shown in FIG. 1 as seen in a normal direction of a surface of an anode 10. FIG. 3 is a schematic sectional view of the electrochemical capacitor shown in FIG. 1 taken along the line X1-X1 of FIG. 1. FIG. 4 is a schematic sectional view showing a major part of the electrochemical capacitor shown in FIG. 1 taken along the line X2-X2 of FIG. 1. FIG. 5 is a partly broken side view of the electrochemical capacitor shown in FIG. 1, whereas its partial section illustrates a major part taken along the line Y-Y of FIG. 1.

As shown in FIGS. 1 to 5, the electrochemical capacitor 1 is mainly constituted by a planar anode 10 (anode) and a planar cathode 20 (cathode) which oppose each other, a planar separator 40 disposed between the anode 10 and cathode 20 adjacent to both of the anode 10 and cathode 20, an electrolytic solution 30, a casing 50 accommodating them in a closed state, an anode lead 12 having one end part electrically connected to the anode 10 and the other end part projecting out of the casing 50, and a cathode lead 22 having one end part electrically connected to the cathode 20 and the other end part projecting out of the casing 50. The "anode" 10 and "cathode" 20 are determined according to their polarities at the time when discharging the electrochemical capacitor 1.

For achieving the above-mentioned object of the present invention, the electrochemical capacitor 1 has a configuration which will be explained in the following.

With reference to FIGS. 1 to 9, details of individual constituents in this embodiment will now be explained.

The casing 50 comprises a first film 51 and a second film 52 which oppose each other. As shown in FIG. 2, the first film 51 and second film 52 in this embodiment are connected to each other. Namely, a rectangular film 53 made of a single composite package film is folded at a fold line X3-X3 shown in FIG. 2, and a pair of opposing fringes of the rectangular film (a fringe 51B of the first film 51 and a fringe 52B of the second film) are overlaid on each other and sealed with an adhesive or by heat, whereby the casing 50 in this embodiment is formed.

The first film 51 and second film 52 represent respective film parts having surfaces (F51 and F52) opposing each other when a single rectangular film is folded as mentioned above. In this specification, the respective fringes of the first film 51 and second film 52 after being joined together are referred to as "seal parts".

This makes it unnecessary to provide a seal part for joining the first film 51 and second film 52 to each other at the part of fold line X3-X3, whereby seal parts in the casing 50 can further be reduced. As a result, the energy density per unit volume of a space where the electrochemical capacitor 1 is to be placed (hereinafter referred to as "volume energy density based on the volume of the space to place"), which will be explained later, can be improved.

In this embodiment, as shown in FIGS. 1 and 2, respective one ends of the anode lead 12 connected to the anode 10 and the cathode lead 22 are arranged so as to project out of the above-mentioned seal part where the fringe 51B of the first film 51 and the fringe 52B of the second film are connected to each other.

The film constituting the first film 51 and second film 52 is a flexible film. Since the electrochemical capacitor 1 comprises the casing 50 formed from a flexible film which is light in weight and can easily be formed into a thin film as such, whereas each of the anode 10, cathode 20, and separator 40 has a planar form, the electrochemical capacitor 1 itself can be formed like a thin film. This can easily improve the original volume energy density of the electrochemical capacitor 1, and the volume energy density based on the volume of the space where the electrochemical capacitor 1 is to be placed.

Here, the "volume energy density" of the electrochemical capacitor is originally defined by the ratio of the total output energy based on the whole volume of the electrochemical capacitor including its container. By contrast, the "volume energy density based on the volume of the space to place" refers to the ratio of the total output energy of the electrochemical capacitor based on an apparent volume of the electrochemical capacitor determined according to the maximum length, maximum width, and maximum thickness thereof. When mounting the electrochemical capacitor to a small-size electronic device in practice, it is important from the viewpoint of effectively utilizing a limited space within the small-size electronic device while fully reducing a dead space to improve the above-mentioned original volume energy density and the volume energy density based on the volume of the space to place.

The first film 51 and second film 52 are not restricted in particular as long as they are flexible films. However, from the viewpoint of securing a sufficient mechanical strength and lightweight of the casing 50 while effectively preventing the moisture and air from entering the casing 50 from the outside and dissipating electrolyte components from the inside of the casing 50 to the outside, they are preferably a "composite package film" comprising, at least, an innermost layer made of a synthetic resin in contact with the electrolytic solution, and a metal layer disposed on the upper side of the innermost layer.

Figure 6:
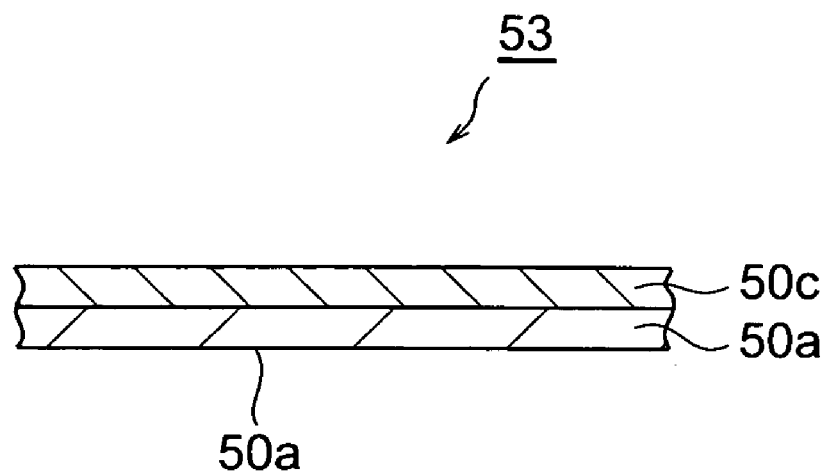
FIG. 6 is a schematic sectional view showing an example of basic configuration of a film to become a constituent material of a casing of the electrochemical capacitor shown in FIG. 1.
Figure 7:
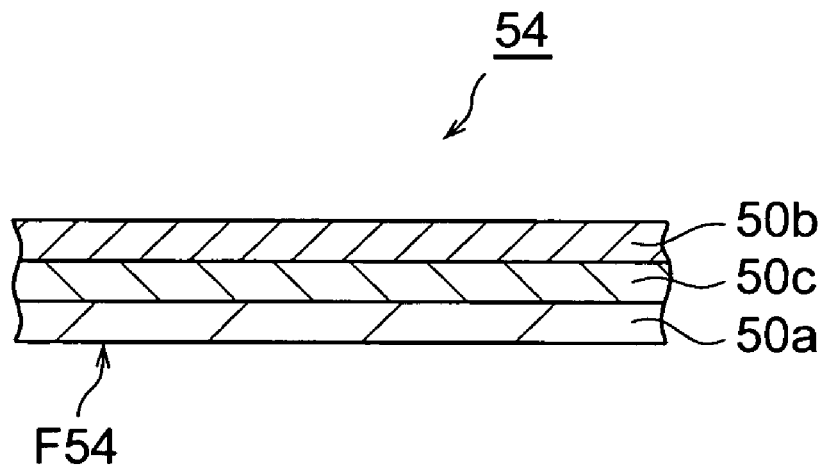
FIG. 7 is a schematic sectional view showing another example of basic configuration of a film to become a constituent material of the casing of the electrochemical capacitor shown in FIG. 1.

Examples of composite package films usable as the first film 51 and second film 52 include those having the configurations shown in FIGS. 6 and 7. The composite package film 53 shown in FIG. 6 comprises an innermost layer 50a made of a synthetic resin in contact with the electrolytic solution by its inner face F50a, and a metal layer 50c disposed on the other surface (outer face) of the innermost layer 50a.

The composite package film 54 shown in FIG. 7 has a configuration in which an outermost layer 50b made of a synthetic resin is further disposed on the metal layer 50c of the composite package film 53 shown in FIG. 6. Here, F54 refers to the inner face of the composite package film 53. The composite package film usable as the first film 51 and second film 52 is not limited in particular as long as it is a composite package film comprising at least two layers composed of at least one synthetic resin layer such as the above-mentioned innermost layer, and a metal layer made of a metal foil or the like. From the viewpoint of more reliably attaining the same effects as those mentioned above, however, it will be more preferred if the film is constituted by at least three layers comprising the innermost layer 50a, the outermost layer 50b made of a synthetic resin disposed on the outer surface side of the casing 50 farthest from the innermost layer 50a, and at least one metal layer 50c disposed between the innermost layer 50a and outermost layer 50b as with the composite package film 54 shown in FIG. 7.

Preferably, the innermost layer 50a, the outermost layer 50b, and the metal layer 50c are constituted by modified polypropylene, polyamide, and aluminum, respectively. This is advantageous in that the sealing property is favorable, the outermost part is highly resistant to chemicals, and the whole film can attain flexibility to deformations.

The innermost layer is a flexible layer. The constituent material of this layer is not limited in particular as long as it is a synthetic resin which can express the flexibility mentioned above, and has chemical stability (property of causing no chemical reaction, no dissolution, and no swelling) with respect to the electrolytic solution in use and chemical stability with respect to oxygen and water (moisture in the air). Preferred is a material further having a property of low permeability to oxygen, water (moisture in the air), and electrolytic solution components. Examples of such a synthetic resin include thermoplastic resins such as polyethylene, polypropylene, acid-modified polyethylene, acid-modified polypropylene, polyethylene ionomers, and polypropylene ionomers.

When a layer made of a synthetic resin such as the outermost layer 50b is further provided in addition to the innermost layer 50a as in the composite package film 54 shown in FIG. 7 mentioned above, this synthetic resin layer may use a constituent material similar to that of the innermost layer 50a. Layers made of engineering plastics such as polyethylene terephthalate (PET) and polyamide (nylon), for example, may also be used as the synthetic resin layer.

Though not restricted in particular, the method of sealing all the seal parts in the casing is preferably heat sealing from the viewpoint of productivity.

Preferably, the metal layer 50c is a layer made of a metal material having an anticorrosion property against oxygen, water (moisture in the air), and the electrolytic solution. Metal foils made of aluminum, aluminum alloys, titanium, and chromium, for example, may also be used as the metal layer 50c.

Figure 8:
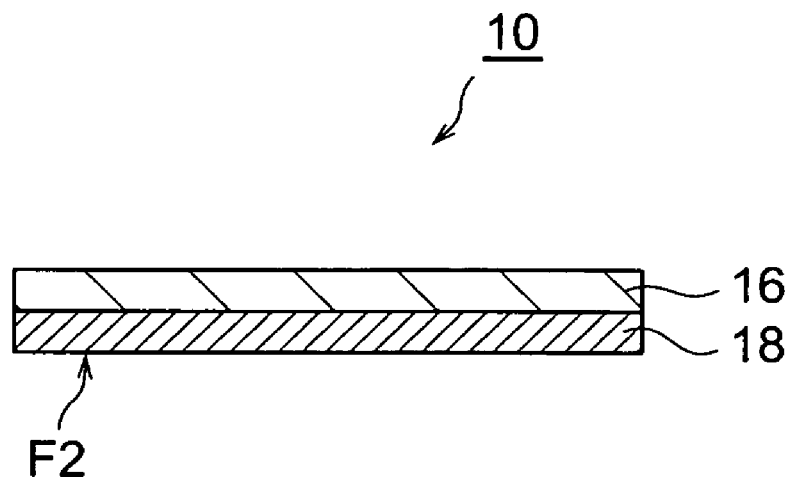
FIG. 8 is a schematic sectional view showing an example of basic configuration of the anode of the electrochemical capacitor shown in FIG. 1.
Figure 9:
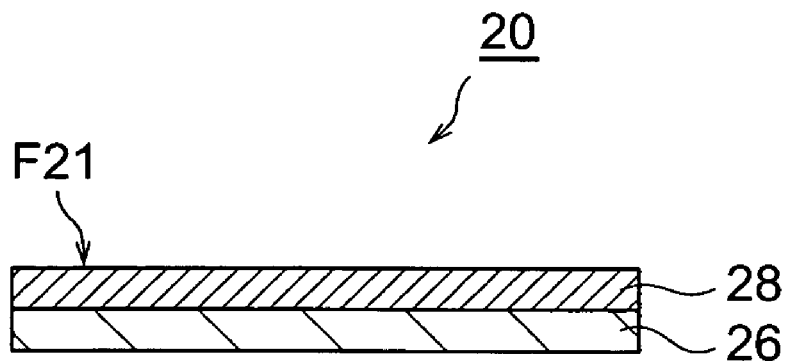
FIG. 9 is a schematic sectional view showing an example of basic configuration of the cathode of the electrochemical capacitor shown in FIG. 1.

The anode 10 and cathode 20 will now be explained. FIG. 8 is a schematic sectional view showing an example of basic configuration of the anode 10 in the electrochemical capacitor 1 shown in FIG. 1. FIG. 9 is a schematic sectional view showing an example of basic configuration of the cathode 20 in the electrochemical capacitor 1 shown in FIG. 1.

As shown in FIG. 8, the anode 10 comprises a collector 16, and an electronically conductive porous layer (a layer of a porous body) 18 formed on the collector 16. This porous layer 18 contains a substantially spherical carbon material having an electronic conductivity as a constituent material. Here, F2 refers to the inner face of the anode 10. On the other hand, as shown in FIG. 9, the cathode 20 comprises a collector 26, and an electronically conductive porous layer (a layer of a porous body) 28 formed on the collector 26. The porous layer 28 contains a fibrous carbon material having an electronic conductivity as a constituent material. Here, F21 refers to the inner face of the cathode 20. The electrochemical capacitor 1 comprises the anode 10 including the porous layer 18 and the cathode 20 including the porous layer 28 as such, and thus has a sufficiently lowered internal resistance and excellent charging/discharging characteristics.

The collectors 16 and 26 are not restricted in particular as long as they are conductors which can sufficiently transfer electric charges to the porous layers 18 and 28, respectively, whereby known collectors used in electric double layer capacitors can be employed. Examples of the collectors 16 and 26 include foils of metals such as aluminum.

Constitutional conditions of the porous layer 18 are not restricted in particular as long as it contains a substantially spherical carbon material (having an aspect ratio of 1.5 or less, preferably 1 to 1.5, more preferably 1 to 1.3) as its constituent material. Preferably, from the viewpoint of more reliably attaining the effects of the present invention, the content of the substantially spherical carbon material in the porous layer 18 is 75 to 90 mass % based on the total mass of the porous layer 18.

Preferred as the substantially spherical carbon material is activated carbon. Preferred examples of activated carbon include those mainly composed of activated coking coal [e.g., petroleum coke made by a delayed coker from material oils such as bottom oils of fluidized catalytic crackers for petroleum-based heavy oils and residual oils of vacuum distillers, carbonized resins (e.g., phenol resins), carbonized natural materials (e.g., coconut shell carbon), etc.]. From the viewpoint of more reliably attaining the effects of the present invention, the specific surface area of the substantially spherical carbon material is preferably 1000 to 3000 $m^2/g$.

The porous layer 18 may further contain a constituent material, such as a binder, other than the carbon material. Its species and content are not restricted in particular. For example, a conductive auxiliary agent (carbon black or the like) for imparting conductivity to carbon powders and a binder (polytetrafluoroethylene, hereinafter referred to as PTFE) may be added.

Constitutional conditions of the porous layer 28 are not restricted in particular as long as its constituent materials include a fibrous carbon material (having an aspect ratio of at least 2, preferably 2 to 8, more preferably 4 to 6). From the viewpoint of more reliably attaining the effects of the present invention, the content of the fibrous carbon material in the porous layer 28 is preferably 75 to 90 mass % based on the total mass of the porous layer 28.

Preferred as the fibrous carbon material is activated carbon. Preferred examples of activated carbon include those mainly composed of activated coking coal [e.g., petroleum coke made by a delayed coker from material oils such as bottom oils of fluidized catalytic crackers for petroleum-based heavy oils and residual oils of vacuum distillers, carbonized resins (e.g., phenol resins), carbonized natural materials (e.g., coconut shell carbon), etc.]. From the viewpoint of more reliably attaining the effects of the present invention, the specific surface area of the substantially spherical carbon material is preferably 1000 to 3000 $m^2/g$.

The porous layer 28 may further contain a constituent material, such as a binder, other than the carbon material. Its species and content are not restricted in particular. For example, a conductive auxiliary agent (carbon black or the like) for imparting conductivity to carbon powders and a binder (polytetrafluoroethylene, hereinafter referred to as PTFE) may be added.

The separator 40 disposed between the anode 10 and cathode 20 is not restricted in particular as long as it is formed from an insulating porous body, whereby known separators used in electric double layer capacitors can be employed. Examples of the insulating porous body include laminates of films made of polyethylene, polypropylene, and polyolefin, extended films of mixtures of the resins mentioned above, and fibrous nonwoven made of at least one species of constituent material selected from the group consisting of cellulose, polyester, and polypropylene.

Here, from the viewpoint of fully securing a contact interface with the electrolytic solution, the void volume Z of the porous body is preferably 50 to 75 μL, more preferably 60 to 70 μL, when the porous body volume is 100 μL. In other words, the ratio of the void volume Z in the porous body is preferably 50% to 75%, more preferably 60% to 70%. The void volume Z can be determined by known methods which are not restricted in particular.

The collector 26 of the cathode 20 is electrically connected to one end of the cathode lead 22 made of aluminum, for example, whereas the other end of the cathode lead 22 projects out of the casing 50. On the other hand, the collector 16 of the anode 10 is electrically connected to one end of the anode lead 12 made of aluminum, for example, whereas the other end of the anode lead 12 projects out of the sealing bag 14.

The inner space of the casing 50 is filled with the electrolytic solution 30, a part of which is contained in the anode 10, cathode 20, and separator 40.

The electrolytic solution 30 is not restricted in particular, whereby known electrolytic solutions (aqueous electrolytic solutions and electrolytic solutions using organic solvents) used in electrochemical capacitors such as electric double layer capacitors can be employed. However, an electrolytic solution using an organic solvent (nonaqueous electrolytic solution) is preferably employed, since the aqueous electrolytic solutions have such an electrochemically low decomposition voltage that the tolerable voltage of the capacitor is limited to a low level.

The species of the electrolytic solution 30 is not restricted in particular, but is chosen in view of the solubility and degree of dissociation of solutes and the viscosity of the liquid in general, and is preferably an electrolytic solution having a high conductivity and a high potential window (high decomposition start voltage). Typical examples include quaternary ammonium salts such as tetraethylammonium tetrafluoroborate dissolved in organic solvents such as propylene carbonate, diethylene carbonate, acetonitrile, γ-butyrolactone, and sulfolane. In this case, it is necessary to control the mingling moisture strictly.

As shown in FIGS. 1 and 2, the part of the anode lead 12 coming into contact with the seal part of a sealing bag constituted by the fringe 51B of the first film 51 and the fringe 52B of the second film is covered with an insulator 14 for preventing the anode lead 12 and the metal layer in the composite package film constituting the individual films from electrically coming into contact with each other. Further, the part of the cathode lead 22 coming into contact with the seal part of the sealing bag constituted by the fringe 51B of the first film 51 and the fringe 52B of the second film is covered with an insulator 24 for preventing the cathode lead 22 and the metal layer in the composite package film constituting the individual films from electrically coming into contact with each other.

The configurations of the insulators 14 and 24 are not restricted in particular, and may be formed from synthetic resins, for example. If the metal layer in the composite package film can sufficiently be prevented from coming into contact with the anode lead 12 and cathode lead 22, the insulators 14 and 24 may be omitted.

From the viewpoint of being placeable in a limited narrow space within a portable small-size electronic device, the thickness of a laminate (the thickness of a matrix 60) constituted by the anode 10, separator 40, and cathode 20 (a laminate composed of the anode, separator, and cathode) is preferably 0.1 to 0.4 mm, more preferably 0.1 to 0.3 mm.

The capacitor capacity of the electrochemical capacitor 1 is preferably $1 \times 10^{-3}$ to 1 F, more preferably 0.01 to 0.10 F. This yields an electric double layer capacitor having a large capacity in spite of its film form. Taking advantage of its thinness, this electric double layer capacitor is employable in IC cards, IC tags, etc. Its usage in toys, portable devices, and the like also expands.

A method of making the above-mentioned casing 50 and electrochemical capacitor 1 will now be explained.

The method of making the matrix 60 (a laminate in which the anode 10, separator 40, and cathode 20 are successively laminated in this order) is not limited in particular, whereby known thin film manufacturing techniques employed in the making of known electrochemical capacitors can be used.

When electrodes to become the anode 10 and cathode 20 are carbon electrodes, sheet-like electrodes can be made by using a carbon material such as activated carbon (a substantially spherical carbon material in the making of the anode 10 and a fibrous carbon material in the making of the cathode 20) by a known method, for example. In this case, for example, a sheet-like electrode is made by the steps of pulverizing the carbon material into particles each having a size of about 5 to 100 μm; regulating their granularity; adding a conductive auxiliary agent (carbon black or the like) for imparting conductivity to the carbon powders, for example, and a binder (polytetrafluoroethylene, hereinafter referred to as PTFE), for example, to the powders, and kneading them; and extending the kneaded product into a sheet. Specifically, the substantially spherical carbon material can be obtained by activating a spherical carbon material having a diameter of 3 to 5 mm and then pulverizing the activated carbon material with a ball mill or jet mill, whereas the fibrous carbon material can be obtained by activating fibrous carbon materials while keeping their long fibrous form and then pulverizing the activated carbon material with a pulverizer of medialess type such as Nea Mill manufactured by Dalton Corporation or Bevel Impactor manufactured by Sugiyama Heavy Industrial Co., Ltd.

Employable as the above-mentioned conductive auxiliary agent is not only carbon black but also powdered graphite or the like. Employable as the binder is not only PTFE but also PVDF, PE, PP, fluorine rubber, or the like.

The anode lead 12 and cathode lead 22 are electrically connected to the anode 10 and cathode 20, respectively. The separator 40 is disposed between the anode 10 and cathode 20 while in contact therewith (in a nonbonding state), whereby the matrix 60 is completed.

An example of method of making the casing 50 will now be explained. First, when constructing the first and second films from the above-mentioned composite package film, a known manufacturing method such as dry lamination, wet lamination, hotmelt lamination, or extrusion lamination is used.

For example, a film to become a layer made of a synthetic resin and a metal foil made of aluminum or the like which constitute a composite package film are prepared. The metal foil can be prepared by extending a metal material, for example.

Next, the metal foil is bonded by way of an adhesive onto the film to become the synthetic resin layer, and so forth, so as to yield the above-mentioned configuration preferably composed of a plurality of layers, thereby making a composite package film (multilayer film). Then, the composite package film is cut into a predetermined size, so as to prepare a single rectangular film 53.

Subsequently, as previously explained with reference to FIG. 2, the single film 53 is folded, and the matrix 60 is held within the folded film 53 (between the first film 51 and second film 52). Here, the lead parts (the anode lead 12 and cathode lead 22) of the matrix 60 partly project out of the casing 50 through the seal parts 51B and 52B. Then, the seal part 51B (fringe 51B) of the first film 51 and the seal part 52B (fringe 52B) of the second film are heat-sealed by a desirable width with a sealer under a predetermined heating condition, for example. Here, for securing an opening for introducing the electrolytic solution 30 into the casing 50, a part is left without being heat-sealed. This yields the casing 50 with an opening.

Then, the electrolytic solution 30 is injected from the opening of the casing 50 containing the matrix 60. Subsequently, while the anode lead 12 and cathode lead 22 are partly inserted in the casing 50, the opening of the casing 50 is sealed with a sealer. Thus, the making of the casing 50 and electrochemical capacitor 1 is completed.

Though the preferred embodiment of the present invention is explained in detail in the foregoing, the present invention is not restricted to the above-mentioned embodiment. For example, though the above-mentioned embodiment mainly explains a configuration which is suitable when the present invention is employed in an electric double layer capacitor, the electrochemical capacitor of the present invention is not limited to the electric double layer capacitor, but is employable, for example, in an electric double layer capacitor such as a redox capacitor having a configuration comprising an anode and a cathode which oppose each other, a planar separator disposed between the anode and cathode adjacent thereto, an electrolytic solution, and a casing accommodating them.

The matrix in the electrochemical capacitor may have not only a three-layer structure in which the separator 40 is disposed between the anode 10 and cathode 20, but also a laminate composed of five or more layers in which electrodes (anodes 10 and cathodes 20) and separators are alternately laminated.

Details of the electrochemical capacitor will now be explained in further detail with reference to Examples and Comparative Examples, which do not restrict the present invention at all.

EXAMPLE 1

In the following procedure, an electrochemical capacitor having the same configuration as with the electrochemical capacitor shown in FIG. 1 was made.

(1) Making of Electrode

An anode (polarizable electrode) and a cathode (polarizable electrode) were made by the following procedure. First, the method of forming the anode will be explained. A substantially spherical activated carbon material (having a specific surface area of 2000 $m^2/g$ and an aspect ratio of 1 to 1.5), a binder (fluorine-based resin, product name "Viton-GF" manufactured by DuPont), and a conductive auxiliary agent (acetylene black, product name "DENKABLACK" manufactured by Denki Kagaku Kogyo K.K.) were compounded such that the mass ratio of carbon material/binder/conductive auxiliary agent=80:10:10, and they were put into and kneaded with NMP (N-methylpyrrolidone) acting as a solvent, whereby an anode forming coating liquid (hereinafter referred to as "coating liquid L1") was prepared.

Subsequently, this coating liquid L1 was uniformly applied onto one surface of a collector (having a thickness of 50 μm) made of an aluminum foil. Thereafter, NMP was eliminated from the coating by drying, and pressure rolls were used for pressing the laminate made of the collector and the dried coating, whereby an electrode (hereinafter referred to as "anode E1") in which an electronically conductive porous layer (having a thickness of 0.120 mm) was formed on one surface of the collector (having a thickness of 50 μm) made of an aluminum foil was produced.

Next, this anode E1 was cut into a rectangular form (having a size of 17.5 mm×32.3 mm), and was dried for at least 12 hours in vacuum at a temperature of 150° to 175° C., so as to eliminate the moisture absorbed by the surface of the electronically conductive porous layer, thereby producing the anode to be mounted to the electrochemical capacitor in accordance with Example 1.

A method of forming the cathode will now be explained. A fibrous activated carbon material (having a specific surface area of 2000 $m^2/g$ and an aspect ratio of 2 to 8), a binder (fluorine-based resin, product name "Viton-GF" manufactured by DuPont), and a conductive auxiliary agent (acetylene black, product name "DENKABLACK" manufactured by Denki Kagaku Kogyo K.K.) were compounded such that the mass ratio of carbon material/binder/conductive auxiliary agent=80:10:10, and they were put into and kneaded with NMP (N-methylpyrrolidone) acting as a solvent, whereby a cathode forming coating liquid (hereinafter referred to as "coating liquid L2") was prepared.

Subsequently, this coating liquid L1 was uniformly applied onto one surface of a collector (having a thickness of 50 μm) made of an aluminum foil. Thereafter, NMP was eliminated from the coating by drying, and pressure rolls were used for pressing the laminate made of the collector and the dried coating, whereby an electrode (hereinafter referred to as "cathode E2") in which an electronically conductive porous layer (having a thickness of 0.132 mm) was formed on one surface of the collector (having a thickness of 50 μm) made of an aluminum foil was produced.

Next, this cathode E2 was cut into a rectangular form (having a size of 17.5 mm×32.3 mm), and was dried for at least 12 hours in vacuum at a temperature of 150° to 175° C., so as to eliminate the moisture absorbed by the surface of the electronically conductive porous layer, thereby producing the cathode to be mounted to the electrochemical capacitor in accordance with Example 1.

(2) Making of Electrochemical Capacitor

First, a tab part (having a width of 4 mm and a length of 3 mm) made of an aluminum foil was provided at the outer periphery of the surface of the collector in each of thus produced anode and cathode on the side free of the electronically conductive porous layer, while in a state where the tab part is electrically connected to the collector. By ultrasonic welding, leads each made of an aluminum ribbon (having a width of 3 mm and a length of 20 mm) were electrically connected to the respective tab parts of the anode and cathode. Subsequently, the anode and cathode are opposed to each other, and a separator made of a regenerated cellulose nonwoven fabric (18.0 mm×33.5 mm with a thickness of 0.05 mm, product name "TF4050" manufactured by Nippon Kodoshi Corporation) was disposed therebetween, whereby a laminate (matrix) in which the anode, separator, and cathode were laminated in this order while in a contact state (nonbonding state) was formed.

Next, a sealant material was attached to the tab parts under heat and pressure. Subsequently, the above-mentioned laminate (matrix) was put into a casing formed from a flexible composite package film, and the tab parts are heat-sealed to each other. As the flexible composite package film, a laminate in which an innermost layer made of a synthetic resin (layer made of modified polypropylene) in contact with an electrolytic solution, a metal layer made of an aluminum foil, and a layer made of polyamide were successively laminated in this order was used. This composite package film was folded into two, and fringes thereof were heat-sealed to each other.

The electrolytic solution (a propylene carbonate solution containing 1.2 mol/L of triethylmethylammonium tetrafluoroborate) was injected into the above-mentioned casing, and then the casing was sealed in vacuum, whereby the making of the electrochemical capacitor (electric double layer capacitor) was completed.

COMPARATIVE EXAMPLE 1

An electrochemical capacitor was made by the same procedure under the same condition as with the electrochemical capacitor in accordance with Example 1 except that an electrode made by the same procedure under the same condition as with the anode mounted to the electrochemical capacitor in accordance with Example 1 was mounted as a cathode, and that an electrode made by the same procedure under the same condition as with the cathode mounted to the electrochemical capacitor in accordance with Example 1 was mounted as an anode.

COMPARATIVE EXAMPLE 2

An electrochemical capacitor was made by the same procedure under the same condition as with the electrochemical capacitor in accordance with Example 1 except that electrodes made by the same procedure under the same condition as with the anode mounted to the electrochemical capacitor in accordance with Example 1 were mounted as an anode and a cathode.

COMPARATIVE EXAMPLE 3

An electrochemical capacitor was made by the same procedure under the same condition as with the electrochemical capacitor in accordance with Example 1 except that electrodes made by the same procedure under the same condition as with the cathode mounted to the electrochemical capacitor in accordance with Example 1 were mounted as an anode and a cathode.

Characteristic Evaluation Tests of Electric Double Layer Capacitor

The following characteristics were determined in the electric double layer capacitors in accordance with Example 1 and Comparative Examples 1 to 3.

For determining charging/discharging, a charging/discharging tester (HJ-101SM6 manufactured by Hokuto Denko Corporation) was used. First, each electric double layer capacitor was subjected to constant-current charging at 0.5 C, and the voltage rising as the electric double layer capacitor accumulated electric charges was monitored. The charging was shifted to constant-voltage charging (relaxation charging) after the potential reached 2.5 V, and was terminated when the current became $\frac{1}{10}$ of the charging current. For discharging, constant-current discharging at 0.5 C was performed until the termination voltage of 0 V. After this test, charging was performed at a current of 1 C. The charging was shifted to constant-voltage charging after the potential reached 2.5 V, and was terminated when the current became $\frac{1}{10}$ of the charging current. For discharging, constant-current discharging at 1 C was performed until the termination voltage of 0 V. Then, charging was started again. The foregoing process was repeated 10 times. Here, "constant-current charging and constant-current discharging at $\beta$ C" refer to charging and discharging an electric double layer capacitor having a capacitor capacity of $\alpha$F with a current of $\beta \times \alpha \times 10^{-3}$ A. In the above-mentioned Examples, the electric double layer capacitor capacity $\alpha$F is about 1.8 F. Therefore, the constant-current charging and constant-current discharging at 1 C refer to the charging and discharging with a current of $1 \times 1.8 \times 10^{-3}$ A, i.e., 1.8 mA, since $\beta=1$. Similarly, the constant-current charging and constant-current discharging at 0.5 C refer to the charging and discharging with a current of $0.5 \times 1.8 \times 10^{-3}$ A, i.e., 0.9 mA, since $\beta=0.5$.

The capacitor capacity (the capacitance of the cell of the electrochemical capacitor) was determined as follows. Namely, a total discharging energy [W·s] was determined as the time integral of discharging energy (discharging voltage×current) from a discharging curve (discharging voltage vs. discharging time), and the capacitor capacity [F] of the evaluated cell was determined by using the relational expression of capacitor capacity [F]=2×total discharging energy [W·s]/(discharging start voltage [V])$^2$.

The internal resistance (impedance) of each electrochemical capacitor was determined by the following method. Namely, the value measured at a frequency of 1 kHz with Solartron (product name manufactured by TOYO Corporation) at a measurement environment temperature of 25° C. and a relative moisture of 60% was indicated.

The "rate characteristic" (C2/C1) was calculated according to the following definition. Namely, "C1" refers to the capacitance obtained when an electrochemical capacitor having a capacitor capacity of $\alpha$F is discharged at a discharging current value of $a \times 10^{-3}$ A. "C2" refers to the capacitance obtained when the electrochemical capacitor from which the above-mentioned C1 is determined (the electrochemical capacitor whose capacitor capacity is $\alpha$F) is discharged at a discharging current value of $100 \times \alpha \times 10^{-3}$ A. The "rate characteristic" refers to the value obtained when the above-mentioned C2 is divided by C1 (C2/C1). Electrochemical capacitors yielding large values of "rate characteristic" can be evaluated as those having excellent charging/discharging characteristics. In the electrochemical capacitor in accordance with Example 1, for example, $\alpha=1.8$, so that C1 is the capacitance measured at the time of discharging at a current value of 1.8 mA, whereas C2 is the capacitance measured at the time of discharging at a current value of 180 mA.

FIG. 10 shows the internal resistances and rate characteristics of the electrochemical capacitors in accordance with Example 1 and Comparative Examples 1 to 3. Among the internal resistance values in FIG. 10, those indicated with "initial" refer to values measured immediately after cells were produced. Among the internal resistance values in FIG. 10, those indicated with "after verifying capacity" refers to values measured after 10 cycles of discharging at 1 C were performed. Among the internal resistance values in FIG. 10, those indicated with "after rate characteristic evaluation test" refer to values measured after residual discharging after performing the rate test after verifying the capacity.

Results of the measurement have proved that Example 1 exhibits a fully lowered internal resistance and an excellent rate characteristic (charging/discharging characteristic) as compared with Comparative Examples 1 to 3.

INDUSTRIAL APPLICABILITY

As explained in the foregoing, the present invention can provide an electrochemical capacitor which has a fully lowered internal resistance and can yield excellent charging/discharging characteristics.

The invention claimed is:

1. An electrochemical capacitor comprising:
   an anode and a cathode opposing each other;
   an insulating separator disposed between the anode and cathode;
   an electrolytic solution; and
   a casing accommodating the anode, cathode, separator, and electrolytic solution in a closed state;
   wherein the anode contains a substantially spherical carbon material having an electronic conductivity as a constituent material;
   wherein the cathode contains a fibrous carbon material having an electronic conductivity as a constituent material; and
   wherein the fibrous carbon material has a specific surface area of 2000 to 3000 $m^2/g$.

2. The electrochemical capacitor according to claim 1,
   wherein the separator comprises an insulating porous body;
   wherein the anode includes a porous layer containing the substantially spherical carbon material;
   wherein the cathode includes a porous layer containing the fibrous carbon material;
   wherein the electrolytic solution is at least partly contained in the anode, cathode, and separator; and
   wherein the ratio of void volume in the porous body to a porous body volume of the porous body contained in the separator is 50% to 75%.

3. The electrochemical capacitor according to claim 1, wherein the electrolytic solution is an electrolytic solution using an organic solvent.

4. The electrochemical capacitor according to claim 1,
   wherein the separator comprises an insulating porous body;
   wherein the anode includes a porous layer containing the substantially spherical carbon material;
   wherein the cathode includes a porous layer containing the fibrous carbon material;
   wherein the electrolytic solution is at least partly contained in the anode, cathode, and separator; and
   wherein the content of the substantially spherical carbon material in the porous layer contained in the anode is 75 to 90 mass % based on the total mass of the porous layer.

5. The electrochemical capacitor according to claim 1, wherein the substantially spherical carbon material has a specific surface area of 1000 to 3000 $m^2/g$.

6. The electrochemical capacitor according to claim 1,
   wherein the separator comprises an insulating porous body;
   wherein the anode includes a porous layer containing the substantially spherical carbon material;
   wherein the cathode includes a porous layer containing the fibrous carbon material;
   wherein the electrolytic solution is at least partly contained in the anode, cathode, and separator; and
   wherein the content of the fibrous carbon material in the porous layer contained in the cathode is 75 to 90 mass % based on the total mass of the porous layer.

7. The electrochemical capacitor according to claim 1, wherein the substantially spherical carbon material has a specific surface area of 2000 to 3000 $m^2/g$.

8. An electrochemical capacitor comprising:
   an anode and a cathode opposing each other;
   an insulating separator disposed between the anode and cathode;
   an electrolytic solution; and
   a casing accommodating the anode, cathode, separator, and electrolytic solution in a closed state;
   wherein the anode contains a substantially spherical carbon material as a constituent material, the substantially spherical carbon material having an electronic conductivity and an aspect ratio of 1 to 1.5;
   wherein the cathode contains a fibrous carbon material as a constituent material, the fibrous carbon material having an electronic conductivity and an aspect ratio of 2 to 8; and
   wherein the fibrous carbon material has a specific surface area of 2000 to 3000 $m^2/g$.

* * * * *